Oct. 5, 1926.  
A. J. QUIDOR ET AL  
1,602,251  
PROCESS AND APPARATUS FOR TAKING CINEMATOGRAPHIC VIEWS AND FILMS OBTAINED THEREBY  
Filed Sept. 16, 1924
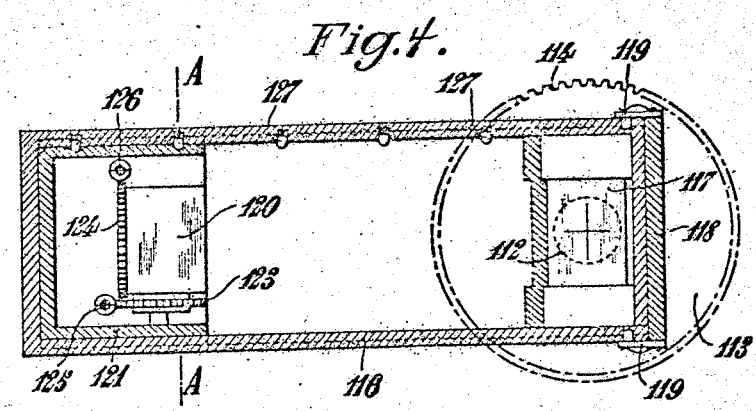
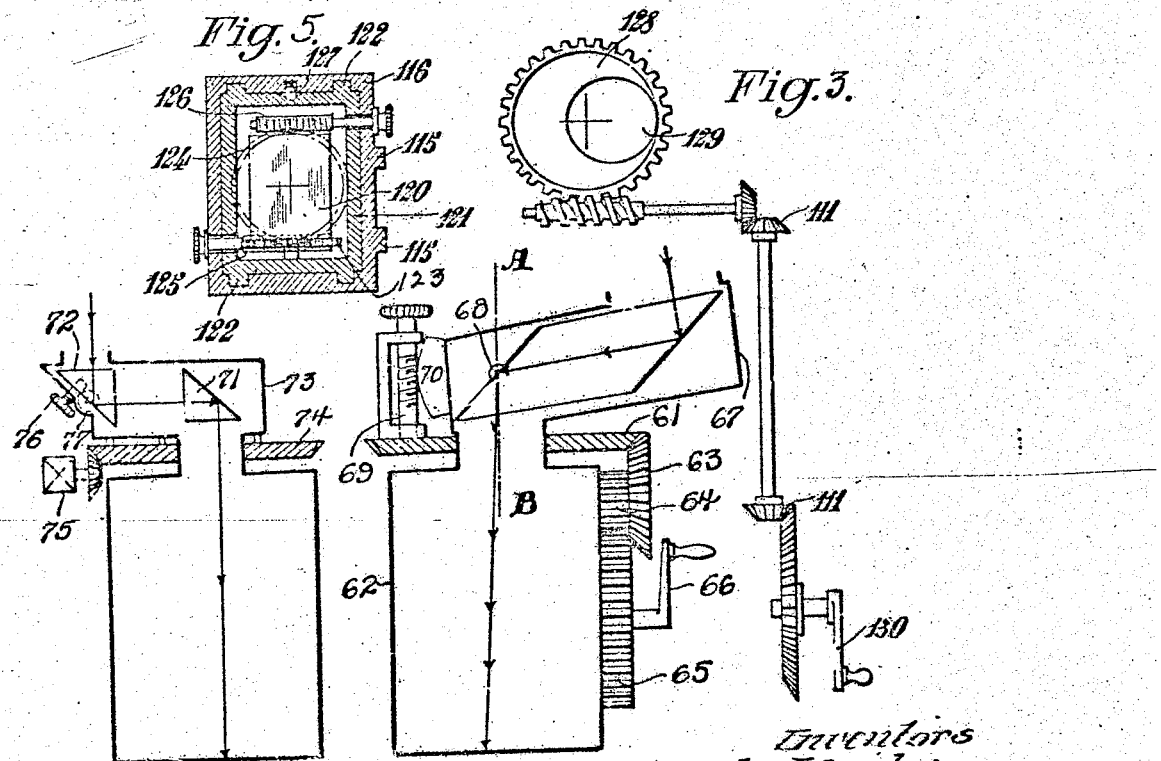

Patented Oct. 5, 1926.

1,602,251

UNITED STATES PATENT OFFICE.

AUGUSTE JOSEPH QUIDOR AND MARCEL ADOLPHE HERUBEL, OF PARIS, FRANCE.

PROCESS AND APPARATUS FOR TAKING CINEMATOGRAPHIC VIEWS AND FILMS OBTAINED THEREBY.

Application filed September 16, 1924, Serial No. 738,054, and in France March 17, 1924.

The present invention relates to a process and to devices for taking cinematographic images in such a manner that these images, when projected according to the customary methods, may give the impression of images in relief.

The invention can be carried out in practice, in a rotating prism or reflector system in front of the lens of the photographic instrument, which is stationary, while the luminous rays reach it in directions which are parallel to the surface of a cone whose apex is a reference point chosen arbitrarily in the direction of the scene to be reproduced cinematographically.

Another form of realization of the invention consists in the combination, with the lens of the camera, of a rotary screen which has eccentric perforations.

The invention furthermore relates to a direct method of determining the reference point without the use of any special viewfinder.

The invention also relates to means for bringing the image of the reference-point exactly upon the centre of the sensitized surface, that is to say, coincident with the optical axis, when the apparatus comprises a system of prisms combined with the lens, said means consisting in a device for the adjustment of the system of prisms itself.

In the accompanying drawings, Fig. 1 is a diagrammatic view of the device according to the invention.

Fig. 2 shows a modified form of the device.

Fig. 3 shows a rotary screen having eccentric perforations which can be combined with the lens of a cinematographic camera.

Fig. 4 is a longitudinal section of an apparatus of the present type provided with a device for adjusting the system of prisms.

Fig. 5 is a cross-section along line A—A of Fig. 10.

In the form of realization of the invention according to Fig. 3, a pinion 61 rotates concentrically to the optical axis of the camera 62 which is stationary. This pinion 61 is driven by pinions 63, 64, 65 and the crank 66. The pinion 61 carries a casing 67 containing an optical system, such as an arrangement of prisms, a set of mirrors or the like, which transmit the rays of light along the path indicated. The casing 67 therefore rotates with the pinion 61. The inclination of the casing relative to the optical axis A—B of the apparatus 62 and about an axis 68 perpendicular to this latter can be modified means of a micrometer screw 69 meshing with a toothed-segment 70 fixed to the casing 67 and concentric with the shaft 68, which is mounted in bearings (not shown), fixed to the pinion 61.

In Fig. 4, the optical device, instead of being constituted by a single prism, consists of two prisms 71 and 72 mounted in a casing 73 fixed upon a rotary plate 74 rotating concentrically with the axis of the apparatus and driven by an independent motor, such as for example, a clockwork mechanism 75. The mechanism for the objective and for feeding the film is driven by the customary means. The modification shown in Fig. 4 consists in that, instead of varying the inclination of the entire system of prisms, as in Fig. 3, the inclination of only one of the prisms is varied, for example, the outer one 72, by means of a micrometer screw 76 which drives a helicoidal wheel 77 keyed upon a shaft which is enclosed in the plane of the hypotenuse of the prism 72.

The device shown in Fig. 3 comprises a screen 128 mounted in front of the objective and rotating in a plane perpendicular to the optical axis of this latter at a speed which is uniform and slow, either continuous or intermittent, this screen having a circular opening 129 which is eccentric relative to the axis of rotation. The centre of this eccentrically placed opening 129 thus describes the basic-circle of a cone, the apex of which is at a great distance. The photographic objective placed behind this screen can therefore be considered as a complex lens, and its different portions may be considered as so many small separate and distinct objectives acting successively, in such a manner that these small objectives can be replaced by a single objective of the same focal length, to which is imparted a rotary motion about the optical axis at a speed equal to that of the circular opening 129. The rotary motion can be imparted to the objective or to the screen by means of a crank 130 and of a series of pinions 111 as shown in the drawing, the said crank, if desired, also controlling the feed of the film.

The radius of the opening 129 may increase in proportion to the distance of its centre from the optical axis, the screen and the orifice both presenting at the limit, the form of a semicircle. It should be added that the orifice 129 could have any other form, since any form of the opening could be brought to the circular form by inscribing in its surface, circles which are tangent to each other and to the limits of said surface.

The perforated rotary screen could also be placed in the rear of the objective or between the two systems of lenses which constitute it, but on condition that a portion of the rays allowed to pass by the diaphragm, reduced to its smallest opening, is always intercepted during the rotation of the screen. It would moreover be possible to replace this diaphragm by a simple eccentric and rotary iris-diaphragm.

In order to avoid the use of a special view-finder, as stated above, the objective itself could be used, owing to the form of construction shown in Fig. 4. In this figure it will be seen that the objective 112 is mounted in the centre of a plate 113 which is provided on its periphery with teeth 114, which serve to drive it. Upon this plate 113 there is removably mounted a box 116 carrying the system of prisms, said box being able to slide, by means of projections 115 in suitable grooves in the plate. This box is held in the correct position, that is to say, with the fixed prism 117 which it contains, located in front of the objective 112, by an abutment 118 and spring-bolts 119. It is thus possible, after having released the bolts to disengage completely the objective 112 by sliding the box 116 upon the plate 113, which enables it to be used for determining the point of reference, the image of this point of reference being thus exactly at the centre of the sensitized surface.

The system of prisms comprises, as in the example shown in Fig. 4, two prisms 117 and 120 and when the box 116 is returned to its place and again obscures the objective 112, the image of the point of reference can only reach the sensitized surface after having passed through the prisms 117 and 120, so that, in order to bring it exactly to the centre of this surface, it is necessary to vary the position of the system of prisms, which can be effected by means of the arrangement shown in Figs. 4 and 5. The prism 117, called inner prism, is at 45° and is located before the objective in such a manner that its silvered or reflecting surface sends back the luminous rays coming from the object photographed to said objective, which rays have been reflected by the second prism 120, known as outer prism. The distance separating these prisms from each other is variable and with this end in view, the prism 120 is mounted in a box 121 capable of sliding in the interior of the box 116 by means of slideways 122 and of being held in any desired position by means of spring-pins 127 or by means of any other suitable device. An opening formed at a suitable point in the box 121 enables the outer face of the prism 120 to receive the luminous rays emanating from the object to be photographed. In order to bring the image of the point of reference to the centre of the sensitized surface, the outer prism must be movable about a vertical axis which coincides with that of its reflecting surface and about a horizontal axis passing through the centre of said surface. These movements are obtained by means of plates or toothed-segments one of which 123 is arranged horizontally and carries the prism 120, while the other 124, is vertical, these plates or segments engaging respectively with micrometer screws 125 and 126 actuated from the exterior of the box, these screws being of course arranged in such a manner as to remain in engagement with their segments whatever may be the movements imparted to the prism, these movements being moreover, always of very slight amplitude.

By these means, the image of the point of reference will be reflected to the centre of the sensitized surface during the period of rotation of the objective about its axis. It is evident that the speed of this rotation can vary according to the distance apart of the prisms 117 and 120.

It would obviously be possible to combine upon the same apparatus, the perforated screen 128 shown in Fig. 3 and the system of prisms 117 and 120 shown in Fig. 4. The effect of relief during projection thus becomes stronger whatever may be the position of the perforated portion of the screen relative to the prism. Nevertheless, the maximum relief will be obtained when the orifice of the screen is diametrically opposed to the outer prism, the screen being arranged between the two constituent parts of the objective. On the contrary, the said orifice should be placed on the same side as the outer prism, if the screen is mounted in front of or behind the objective.

The movement of the crank controlling the feed of the film is transmitted by means of pinions, as shown in Fig. 9, or by means of belts to the plate 113, to which the objective may or may not be fixed, and to the screen. The rotation thus obtained may be continuous or intermittent and the objective itself may or may not take part therein independently of the screen and the system of prisms.

The combination of a perforated screen as described with an objective can be utilized in ordinary stereoscopy for the purpose of increasing the effect of relief, as well as in micro-photography for the purpose of obtaining stereoscopic clichés, the screen, in this case, not being given a rotary motion.

but being merely rotated by half a turn after each photograph has been taken, it could also be applied to microscopic cinematography in relief, the screen being then given a very slow rotary motion communicated by the crank of the cinematographic camera placed above the microscope. It could also be used for the direct projection, with relief, of any preparations or objects, the screen being then given the rotary movement mentioned above.

It is moreover evident that these devices could be put to a variety of uses and that various modifications could be made both in the arrangement of the parts as well as in their form without thereby altering the spirit of the invention.

We claim:

1. A process of obtaining cinematographic views giving, when projected, the impression of the distance and relief of the objects, which consists in causing the axis of the beam of light received by a sensitized surface to rotate about the optical axis of a camera, so that the axis of the beam remains at a constant angle with said optical axis, while maintaining the camera, whose axis is stationary, also stationary, and so that the axis of said beam passes through a fixed point which is in space situate upon said optical axis, and forms, with the incident surface of the optical system of the apparatus, an angle less than a right angle.

2. An apparatus for obtaining cinimatographic views, giving, when projected, the impression of the distance and relief of the objects comrising a cinematographic camera whose optical axis passes through a fixed point in space, an auxiliary optical system to which is imparted a rotary movement in a plane perpendicular to the optical axis at a speed enabling more than four views to be taken at each complete revolution, and means for causing rotation of the auxiliary optical system.

3. An apparatus for obtaining cinematographic views giving, when projected, the impression of the distance and relief of the objects comprising a stationary cinematographic camera the optical axis of which is also stationary, an auxiliary optical system cooperative with the objective and consisting of a screen having an opening arranged eccentrically relative to the optical axis, and means for imparting a rotary movement to the screen in a plane perpendicular to the optical axis with a velocity such as to enable more than four views to be taken for each complete rotation of the screen.

4. An apparatus for obtaining cinematographic views, giving, when projected, the impression of the distance and relief of the objects comprising a stationary cinematographic camera, the optical axis of which passes through a fixed point in space, an auxiliary optical system associated with the objective and composed of a screen having an opening of variable shape arranged eccentrically relative to the optical axis, this screen being formed at the limit of its opening by a semi-circle, and means for imparting a rotary movement to ths screen in a plane perpendicular to the optical axis at a speed which enables more than four views to be obtained for each complete rotation of the screen.

5. An apparatus for obtaining cinematographic views, giving, when projected, the impression of the distance and relief of the objects comprising a stationary cinematographic camera, the optical axis of which passes through a fixed point in space, an auxiliary optical system cooperative with the objective and formed by a screen having an opening of variable shape arranged eccentrically relative to the optical axis, said screen being formed at the limit of its opening by a semi-circle, and means for imparting to the said screen a rotary movement in a plane perpendicular to the optical axis at a velocity enabling more than four views to be obtained for each complete rotation of the screen.

6. An apparatus for obtaining cinematographic views giving, when projected, the impression of the distance and relief of the objects comprising a stationary cinematographic camera, the optical axis of which passes through a fixed point in space, an auxiliary optical system formed of reflecting surfaces, one of which is arranged in front of the objective while the other is displaced relative to this latter and receives, at an angle less than a right angle, the axis of the beam of light which acts upon the sensitized surfaces and which passes through a fixed point in space, forming a constant angle with the optical axis, means for imparting to the two reflecting surfaces a rotary movement in a plane perpendicular to the optical axis at a velocity enabling more than four images to be obtained for each complete rotation of the screen.

7. An apparatus for obtaining cinematographic views giving, when projected, the impression of the distance and relief of the objects comprising a stationary cinematographic camera, the optical axis of which passes through a fixed point in space, an auxiliary optical system formed of reflecting surfaces, one of which is arranged in front of the objective while the other is displaced relative to this latter and receives, at an angle less than a right angle, the axis of the beam of light which acts upon the sensitized surfaces and which passes through a fixed point in space, forming a constant angle with the optical axis, means for imparting to the two reflecting surfaces a rotary movement in a plane perpendicular to the optical axis at a velocity enabling more than four images to be obtained for each complete rotation of the screen, means for causing the outer reflecting surface to assume, relative to its original position, an angle equal to the half of the angle between the axis of the luminous beam and the optical axis, and in such a manner that the axis of the beam of light is situated in the plane which passes through the optical axis while at the same time being perpendicular to this reflecting surface, and means for relatively moving the two reflecting surfaces in a direction towards or away from each other.

8. An apparatus for obtaining cinematographic views, giving, when projected, the impression of the distance and relief of the objects comprising a stationary cinematographic camera, the optical axis of which passes through a fixed point in space, an optical system constituted by a perforated screen placed eccentrically relatively to the objective and by a system formed of two reflecting surfaces, one internal, the other external, and means for rotating the screen and the reflecting surfaces in a plane perpendicular to the optical axis and at the same speed, the eccentric opening of the screen being, during the entire rotation, diametrically opposite to the external reflecting surfaces.

9. An apparatus for obtaining cinematographic views, giving, when projected, the impression of the distance and relief of the objects comprising a stationary cinematographic camera, the optical axis of which passes through a fixed point in space, an optical system constituted by an eccentric perforated screen placed in cooperative relation with the objective and by a system composed of two reflecting surfaces one internal and the other external, and means for causing the screen and the reflecting surfaces to rotate in a plane perpendicular to the optical axis and at the same velocity, the eccentric opening of the screen being diametrically opposite to the inner reflecting surfaces.

10. An apparatus for obtaining cinematographic views, giving, when projected, the impression of the distance and relief of the objects, comprising a stationary cinematographic camera, the optical axis of which passes through a fixed point in space, an optical system constituted by an eccentrically perforated screen placed in cooperative relation with the objective and by a system formed of two reflecting surfaces, one internal and the other external, and means for causing the screen and the reflecting surfaces to rotate in a plane perpendicular to the optical axis and at the same speed, the eccentric opening of the screen being diametrically opposite the internal reflecting surfaces.

QUIDOR, AUGUSTE JOSEPH.
MARCEL ADOLPHE HERUBEL.